(12) United States Patent
Oosterhuis et al.

(10) Patent No.: US 9,637,297 B2
(45) Date of Patent: May 2, 2017

(54) STORAGE DEVICE FOR FRESH PRODUCTS, AND TABLET AND METHOD THEREFOR

(75) Inventors: Antoon Siefko Oosterhuis, Heereveen (NL); Hans Hendrik Wolters, Leeuwarden (NL); Wouter Bernardus Cornelis De Heij, Wageningen (NL)

(73) Assignees: A.S. Oosterhuis Beheer B.V., Heerenveen (NL); Triple H B.V., Leeuwarden (NL); Top B.V., Wageningen (NL)

( * ) Notice: Subject to any disclaimer, the term of this patent is extended or adjusted under 35 U.S.C. 154(b) by 681 days.

(21) Appl. No.: 13/979,483

(22) PCT Filed: Jan. 12, 2012

(86) PCT No.: PCT/NL2012/050021
§ 371 (c)(1),
(2), (4) Date: Oct. 4, 2013

(87) PCT Pub. No.: WO2012/096578
PCT Pub. Date: Jul. 19, 2012

(65) Prior Publication Data
US 2014/0017988 A1  Jan. 16, 2014

(30) Foreign Application Priority Data

Jan. 12, 2011 (NL) ...................... 2005990

(51) Int. Cl.
A47J 47/00 (2006.01)
B65D 81/18 (2006.01)
A23B 4/16 (2006.01)
F25D 17/04 (2006.01)
A23L 3/3418 (2006.01)
A23B 7/148 (2006.01)

(52) U.S. Cl.
CPC ............... B65D 81/18 (2013.01); A23B 4/16 (2013.01); A23B 7/148 (2013.01); A23L 3/3418 (2013.01); F25D 17/042 (2013.01)

(58) Field of Classification Search
CPC .......... B65D 81/18; A23B 4/16; A23L 3/3418
USPC ............................................... 454/173; 62/78
See application file for complete search history.

(56) References Cited

U.S. PATENT DOCUMENTS 2,189,390 A * 2/1940 Belshaw ................. F25D 7/00
261/108
3,102,777 A * 9/1963 Karakian ................ A23B 4/16
422/40

(Continued)

FOREIGN PATENT DOCUMENTS

CN 2030018 U 1/1989
DE 3924589 C1 12/1990

(Continued)

*Primary Examiner* — Steven B McAllister
*Assistant Examiner* — Jonathan Cotov
(74) *Attorney, Agent, or Firm* — The Webb Law Firm (57) ABSTRACT

The present invention relates to a storage device for fresh products and/or perishable produce and a method for storing fresh products, comprising: a cabinet provided with an access door and/or flap; one or more substantially gastight compartments arranged in the cabinet and provided with at least one gas inlet and one gas outlet; and conditioning means suitable for conditioning the climate in the compartment, wherein the conditioning comprises of providing desired gas conditions, including oxygen content.

21 Claims, 4 Drawing Sheets

(56) References Cited

U.S. PATENT DOCUMENTS

| | | | | |
|---|---|---|---|---|
| 3,242,980 | A * | 3/1966 | Bemiss | A47B 31/02 165/50 |
| 5,007,249 | A * | 4/1991 | Van Druff, Jr. | A47F 3/0439 454/173 |
| 5,046,332 | A * | 9/1991 | Herrmann | A23L 3/3418 62/388 |
| 5,102,627 | A * | 4/1992 | Plester | B01J 7/02 261/DIG. 7 |
| 5,110,014 | A * | 5/1992 | Doundoulakis | B67D 1/0412 222/396 |
| 5,201,183 | A * | 4/1993 | Ramos | F25D 3/107 62/294 |
| 5,561,915 | A * | 10/1996 | Vandergriff | F26B 25/063 141/10 |
| 5,598,713 | A * | 2/1997 | Bartilucci | F25D 3/105 62/384 |
| 5,649,995 | A * | 7/1997 | Gast, Jr. | A23L 3/3418 426/419 |
| 6,405,644 | B1 | 6/2002 | Windecker | |
| 6,460,352 | B1 * | 10/2002 | Lemcoff | A23B 7/152 62/127 |
| 6,901,768 | B1 * | 6/2005 | Windecker | F25D 17/045 62/239 |
| 7,205,016 | B2 * | 4/2007 | Garwood | A23B 4/10 426/108 |
| 7,325,409 | B2 * | 2/2008 | Espinosa | A47F 3/001 62/169 |
| 2002/0033023 | A1 * | 3/2002 | Kroll | A23L 3/3418 62/78 |
| 2005/0217282 | A1 * | 10/2005 | Strohm | A23B 7/152 62/78 |
| 2008/0317820 | A1 * | 12/2008 | Rathbone | A61D 7/00 424/438 |
| 2009/0162489 | A1 * | 6/2009 | Singh | A23C 9/18 426/72 |

FOREIGN PATENT DOCUMENTS

| | | | |
|---|---|---|---|
| EP | 1972872 | A1 | 9/2008 |
| FR | 2606982 | A1 | 5/1988 |
| FR | 2868254 | A1 | 10/2005 |
| NL | WO9902048 | * | 1/1999 |
| WO | 9831235 | A1 | 7/1998 |
| WO | 9902048 | A1 | 1/1999 |
| WO | 0192797 | A1 | 12/2001 |

* cited by examiner

STORAGE DEVICE FOR FRESH PRODUCTS, AND TABLET AND METHOD THEREFOR

CROSS-REFERENCE TO RELATED APPLICATIONS

This application is the U.S. national phase under 35 U.S.C. §371 of International Application No. PCT/NL2012/050021 filed Jan. 12, 2012, entitled "Storage Device for Fresh Products, and Tablet and Method Therefor", and claims priority under 35 U.S.C. §119(a)-(d) to Netherlands Patent Application No. 2005990 filed on Jan. 12, 2011 in the Netherlands Intellectual Property Office, the disclosures of which are hereby incorporated by reference in their entirety.

The present invention relates to a storage device for fresh products and/or perishable produce such as hard fruit, tropical fruit, fish, cheese and meat, soft vegetables and hard vegetables. Such a storage device is more specifically suitable for use in a kitchen, catering establishment or shop.

Storage devices known in practice are refrigerators with which to keep products which are susceptible to perishing fresh. Fresh products are usually also purchased with greater frequency by consumers so that they are guaranteed fresh products. A further alternative, or addition, for a number of products, including for instance meat and fish, is to freeze these products. A freezer or freezer compartment is necessary for this purpose. A problem here is that such freezers usually require a large capacity to be able to meet the continuous need for fresh products. Although a refrigerator improves the shelf life of fresh products, this improvement is only limited for many of these products in respect of extending their lifespan or shelf life.

The object of the present invention is to provide a device for storing fresh products with which the above stated problems are wholly or at least partially obviated.

The present invention provides for this purpose a storage device for fresh products and/or perishable produce, the device comprising:
- a cabinet provided with an access door and/or flap;
- one or more substantially gastight compartments arranged in the cabinet and provided with at least one gas inlet and one gas outlet; and
- conditioning means suitable for conditioning the climate in the compartment, wherein the conditioning comprises of providing desired gas conditions, including oxygen content.

Providing a cabinet in which one or more compartments are arranged achieves that such a compartment can be conditioned to desired conditions. These desired conditions relate for instance to the temperature and the relative air humidity (RH). According to the invention however, the gas conditions in such a compartment are also conditioned. In the context of the present invention these gas conditions are in any case understood to mean the oxygen content. In a currently preferred embodiment the oxygen content is influenced by introducing nitrogen and/or nitrogen-enriched air or gas. The one or more compartments are provided in substantially gastight, i.e. airtight, manner to enable gas conditions to be maintained. In a currently preferred embodiment a compartment can be flushed, for instance with nitrogen, in order to obtain desired conditions, in particular a low oxygen content. Use can be made here of a pump. The number of components can amount to one, for instance aimed at ripening products, for instance apples, pears and tropical fruit such as bananas, although it is also possible to provide a plurality of compartments. These compartments can be provided fixedly in the cabinet, but can also be provided as individual drawers or in other manner as removable elements.

It is per se known that fresh products can be stored for longer periods at for instance low oxygen concentrations. Apples are thus stored for instance in climate cells at relatively low oxygen contents. A problem here is that such climate cells are not suitable for use in for instance a kitchen of a home.

The storage device is preferably dimensioned such that products can be placed in the compartments by reaching into an individual compartment from outside the device. This has the advantage for instance that products can be placed or removed without breathing in conditioned gas.

By preferably providing the compartments in a manner in which they can be individually conditioned and preferably also providing them with individual adjusting means, diverse groups of fresh products can be stored in the desired conditions associated with these products. This increases the lifespan of these products enormously in respect of storage thereof. It has been found that for the application intended with the present invention fresh products can from a practical viewpoint be divided into five groups, viz: a) hard fruit such as apples, b) tropical fruit such as mangoes and bananas, c) fish, cheese and other dairy products, and meat, d) soft vegetables such as lettuce, and e) hard vegetables such as carrots. Defined in this exemplary classification are five fresh product groups which are preferably each kept in good condition under their own desired conditions. Other classifications are of course also possible depending on, among other factors, the wishes of a user and/or the number of compartments in the device.

The conditioning makes it for instance possible to store products for longer periods of time, for instance typically for a period of a week in the case the storage device according to the invention is applied in the kitchen of a home. It is hereby only necessary to go shopping once a week for the purpose of providing fresh products in a household.

The specific gas conditions can for instance derive from a bottle or tank or from another source. Gas conditions can hereby be conditioned. This conditioning preferably comprises a control and preferably a regulation for the gas conditions in the individual compartments. The regulation makes use here of one or more sensors in the conduits and/or compartment of the device. In a currently preferred embodiment the different compartments can be individually adjusted and conditioned. Each compartment is preferably provided for this purpose with its own adjusting means for adjusting the desired climate, particularly temperature, RH and oxygen content.

For most fresh products, temperatures in the individual compartments are kept between 0° C. and 10° C., the oxygen concentration between 0 and 18% and the RH between 80% and 98%. The compartments are preferably embodied as drawers such that only the actually required compartments are opened for the purpose of placing or removing fresh products. This limits unnecessary reconditioning of compartments. Drawers have been found particularly advantageous here since, when they are opened, conditioned air is prevented from flowing out of the device. This limits reconditioning.

Such a storage device according to the invention can be applied in a kitchen of a home and applied in a catering establishment and shop. In all these cases there is a limited quantity of the different categories of fresh product which have to be kept fresh for a period of for instance a week. In the case of household use it is thus possible for instance to do the shopping at the weekend, including the fresh products, and store these at the desired quality level for a week.

In a currently preferred embodiment it is also possible to control and preferably regulate gas conditions other than the oxygen content. It is for instance possible here to envisage the ethylene content of the gas conditions in a specific compartment. The ethylene content is particularly important in the ripening of fresh products. It is in this way possible to use the storage device to ripen fresh products. Not only can the quality of the products hereby be maintained, it can even be enhanced. A ripening function is hereby achieved. It is for instance hereby possible to set conditions such that products are ripe at the moment of anticipated use, for instance when leaving for school or work. The quality of the products is in this way geared to the moment when it is consumed. An example hereof is the ripening of tropical products such as mangoes and kiwis. These products are usually supplied in unripe state to supermarkets, where they are usually also presented to consumers in a not fully ripe state. Using the storage device according to the invention it is possible for the consumer to wholly or partially complete the ripening at the desired moments. This limits waste, loss and distribution of these fresh products.

With the device according to the invention ingoing air is optionally guided along a cooled element or surface, whereby water condenses from the air. An optimal moisture management is hereby realized in the device. This is particularly advantageous when the dehumidification is performed on air which is supplied to the nitrogen membrane with which desired gas conditions are realized. It has been found here that the lifespan of such a membrane is increased as a result of the drier air.

In an advantageous preferred embodiment according to the present invention the storage device comprises a conditioning controller for adapting the conditions in compartments to each other such that an outlet of the compartment is operatively connected to an inlet of another compartment.

When use is made of a classification of fresh products as stated above, wherein different groups are defined which each have separate desired conditions, it is possible with a conditioning controller to adapt these conditions to each other in order to thereby realize an effective and efficient storage. It is thus possible for instance to store apples at a low oxygen content and other fresh products at a slightly higher oxygen content. By operatively connecting the inlet and the outlet of these different compartments to each other it is possible to realize a suitable oxygen content in each compartment. The energy required for the conditioning is hereby limited, resulting in an energy-efficient device.

Surprisingly, it has been found that by connecting inlets and outlets of compartments to each other in artful manner a controlled ripening can for instance be performed. It is thus possible for instance to use ethylene production by a category of product in a first compartment in a second compartment in order to ripen another category of product. An optimal storage and ripening is hereby achieved with minimal energy consumption.

In an advantageous preferred embodiment according to the present invention the storage device comprises a gas generator.

Providing a gas generator achieves that no separate tank or bottle is required for the purpose of the conditioning. In this currently preferred embodiment the storage device according to the invention can be used as it were as a stand-alone. The user-friendliness of the storage device is hereby also increased. In a currently preferred embodiment use is made of a nitrogen generator.

The gas generator preferably comprises a nitrogen membrane. The membrane separates the nitrogen from the other components in the gas, such as water vapour, oxygen and $CO_2$. This achieves that the storage device can itself produce a supply gas with a low oxygen content suitable for conditioning the one or more compartments of the storage device according to the invention. This achieves a user-friendly and safe storage device according to the invention. The ingoing air is preferably filtered here in order to separate particles and moisture before it is supplied to the membrane. This increases the lifespan of the membrane.

In a currently preferred embodiment the system is controlled on the basis of an oxygen measurement. It has been found that the shelf life of fresh products can hereby be extended.

In a further advantageous preferred embodiment according to the present invention the cabinet is adapted so that it can be placed as build-in appliance in a kitchen.

The application is further simplified by providing the cabinet such that a storage device according to the invention can be placed as build-in appliance in a kitchen. It is in this way possible to fully integrate the storage device with existing kitchen appliances. It is for instance possible here to supplement a refrigerator, and optionally a refrigerator/freezer combination, with the storage device according to the present invention in order to thereby have the best possible conditioning for all time periods. The cooling equipment can optionally be shared here. A freezer compartment can for instance be used for the long-term storage, the cooling part of the refrigerator for short-term storage of fresh products, and the storage device according to the invention can be used here for intermediate periods, as well as for products which are less suitable for the freezer compartment.

In an advantageous preferred embodiment according to the present invention the storage device comprises an external draining connection for drawing off conditioned gas.

Providing an external draining connection achieves that the storage device can also be used to provide desired gas conditions in an opened package. Use is preferably made here of a storage device provided with its own gas generator, for instance in the form of a nitrogen membrane. Such opened packages are for instance opened salad mix packages, as well as opened wine bottles or bottles of fruit juice. Providing these opened packages with a conditioned gas also greatly improves the shelf life of these products outside the storage device. It is of course also possible to place this opened package in a compartment of the storage device.

It is further possible to use the draining connection to "flush" storage packages which are preferably specifically suitable for this purpose, for instance storage containers, for instance for a longer storage life of leftovers of meals. The "flushing" with the conditioned air results in a better storage climate in the storage package. This reduces the amount of food and other waste.

In a further advantageous preferred embodiment of the present invention the storage device comprises a filling opening for the supply of gas conditioning products or compositions.

Providing a filling opening makes it possible to supply compositions or other products in a liquid and/or solid state to the storage device. These products or compositions are then used to generate the desired gas conditions, for instance with its own gas generator such as a nitrogen membrane. It is also possible to control other gas conditions with such supplied products or compositions. It is for instance possible here to envisage the $CO_2$ content and the ethylene content.

The filling opening is preferably provided as a type of tablet storage space, as is commonly used in many of the current dishwashers known in practice. Supplying the products or compositions in the form of a tablet greatly increases the user-friendliness. Errors in the supply of these products or compositions can also be avoided.

In an advantageous preferred embodiment according to the invention the storage device comprises one or more connectors for operatively connecting the one or more compartments to conditioning equipment placed outside the storage device.

By providing connectors a storage device can be connected in simple manner to preferably centrally placed conditioning equipment. This can for instance be applied in supermarkets by moving the storage device at a desired moment from a storage area to the shop space and there connecting it with the connectors to wall connections which are connected to the conditioning equipment. This also prevents sound production in the shop space. The conditioning equipment can also be operated under optimal conditions and for instance be used for a plurality of storage devices so that energy consumption can be limited.

Displacing means such as wheels are preferably provided for displacing the storage device such that an operative connection can be realized via connectors. The storage device is preferably moved to a position in front of a wall and as it were pressed against the wall, so that the connectors of the device connect to the conditioning equipment.

In an advantageous preferred embodiment according to the invention the one or more compartments are displaceable independently of the cabinet and embodied such that a compartment can be placed in and removed from the cabinet.

Through being able to displace the compartments independently of the cabinet, the cabinet with associated equipment can remain substantially at a fixed position while products are supplied and optionally removed in compartments. This can for instance be applied in the ripening of bananas. The one or more compartments are advantageously embodied here as rolling containers. It is thus possible for instance to move a rolling container of bananas or other products into a cabinet and then ripen them.

The invention further relates to a storage package, for instance a storage container, suitable for application in combination with an above stated storage device.

Such a storage package provides the same effects and advantages as described for the storage device. The storage package is preferably provided here with an inlet suitable for connection to a draining connection of the storage device. An outlet is preferably also provided which allows gas to escape in case of an overpressure in the storage package. The storage package can hereby as it were be "flushed" after connection to the draining connection of the storage device and in this way realize in the storage package the climate conditions most suitable for storage. Alternatively, additionally or in combination, the storage package can be provided with an inlet suitable for connection to an external gas supply, therefore independently of above stated device according to the invention, for instance in the form of a spray can and/or pressure pack.

The invention further relates to a tablet suitable for application in an above stated storage device.

Such a tablet provides the same effects and advantages as described for the storage device. Providing a tablet achieves that a storage device can be provided with so-called gas conditioning products or compositions. It is for instance possible here to envisage a tablet for producing $CO_2$. This is for instance possible by providing a tablet comprising carbonate for the purpose of thereby realizing a quantity of $CO_2$, with which gas conditions in a compartment can be regulated. In addition or alternatively, a tablet can be provided with means for producing ethylene for the particular purpose of ripening products. This is particularly relevant for the fresh tropical products, for instance mangoes. This can for instance be realized by providing a tablet of or from carbide. Carbide, or calcium carbide $CaC_2$, is a solid substance which is for instance made by heating calcium oxide (quicklime) with carbon.

The present invention further also relates to a method for storing fresh products, the method comprising of:
  placing the products in a storage device as described above;
  selecting the desired conditions for the product; and
  storing the products in the storage device.

The method according to the invention provides the same effects and advantages as described for the storage device and the tablet.

It is possible with the method to purchase fresh products at desired times and store them for a period of time. This storage preferably also comprises of ripening products as described above. The storage in this way becomes even more effective, since the ripening can be combined therewith.

In a currently preferred embodiment the storage of the products preferably comprises of displacing and subsequently connecting the storage device to a centrally positioned conditioning system. This is for instance useful in a supermarket as described above in respect of the storage device.

The method according to the invention preferably makes use of one or more of the measures stated above in respect of the storage device. It is thus possible for instance to use the ethylene produced in a compartment in a different compartment for the purpose of ripening other products.

Further advantages, features and details of the invention are elucidated on the basis of preferred exemplary embodiments thereof, wherein reference is made to the accompanying drawings.

Figure 1:
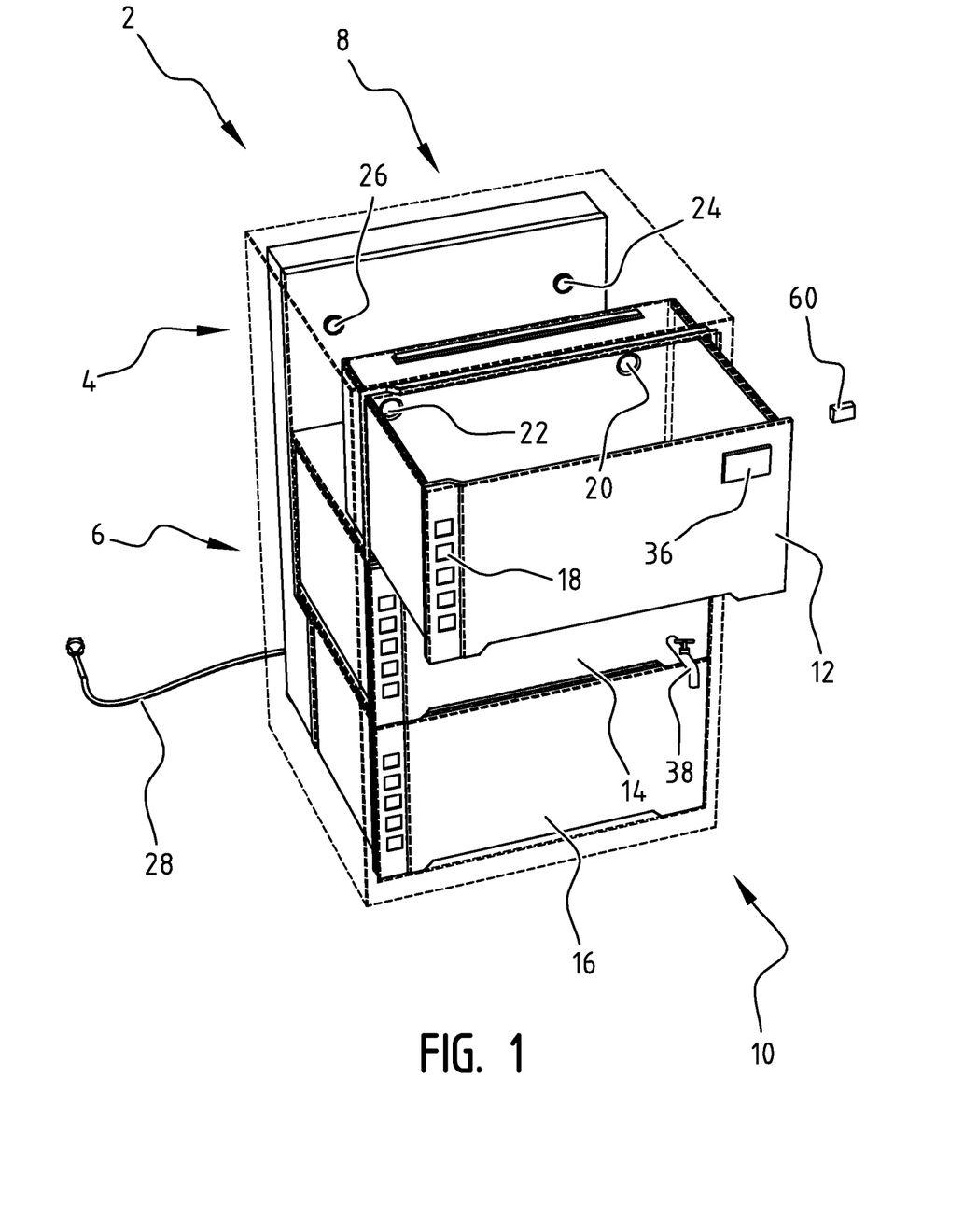
FIG. 1 is a view of a storage device according to the invention.

A storage device 2 (FIG. 1) has a cabinet 4 with sides 6 and a rear side 8. Located on front side 10 are a number of compartments 12, 14, 16 which in the shown embodiment are provided with a transparent panel. Also shown in the shown embodiment on the left-hand side of compartments 12, 14, 16 are a number of pictograms functioning as setting button 18 for the purpose of the selected product group. The climate in the compartment is controlled on the basis hereof. For this purpose compartment 12 has a feed 20 and discharge 22 using feed conduit 24 and discharge conduit 26. Compartments 12, 14, 16 are shown as drawers in the shown embodiment. Other embodiments are of course also possible.

Storage device 2 is provided with an electrical cable 28 (FIG. 2) for the purpose of providing power to the climate equipment provided in system space 34 behind rear side 8 provided with gratings 32. The climate equipment is not shown in the figure for the sake of clarity. This equipment is for instance a cooling installation, dehumidifier and/or nitrogen generator.

Figure 2:
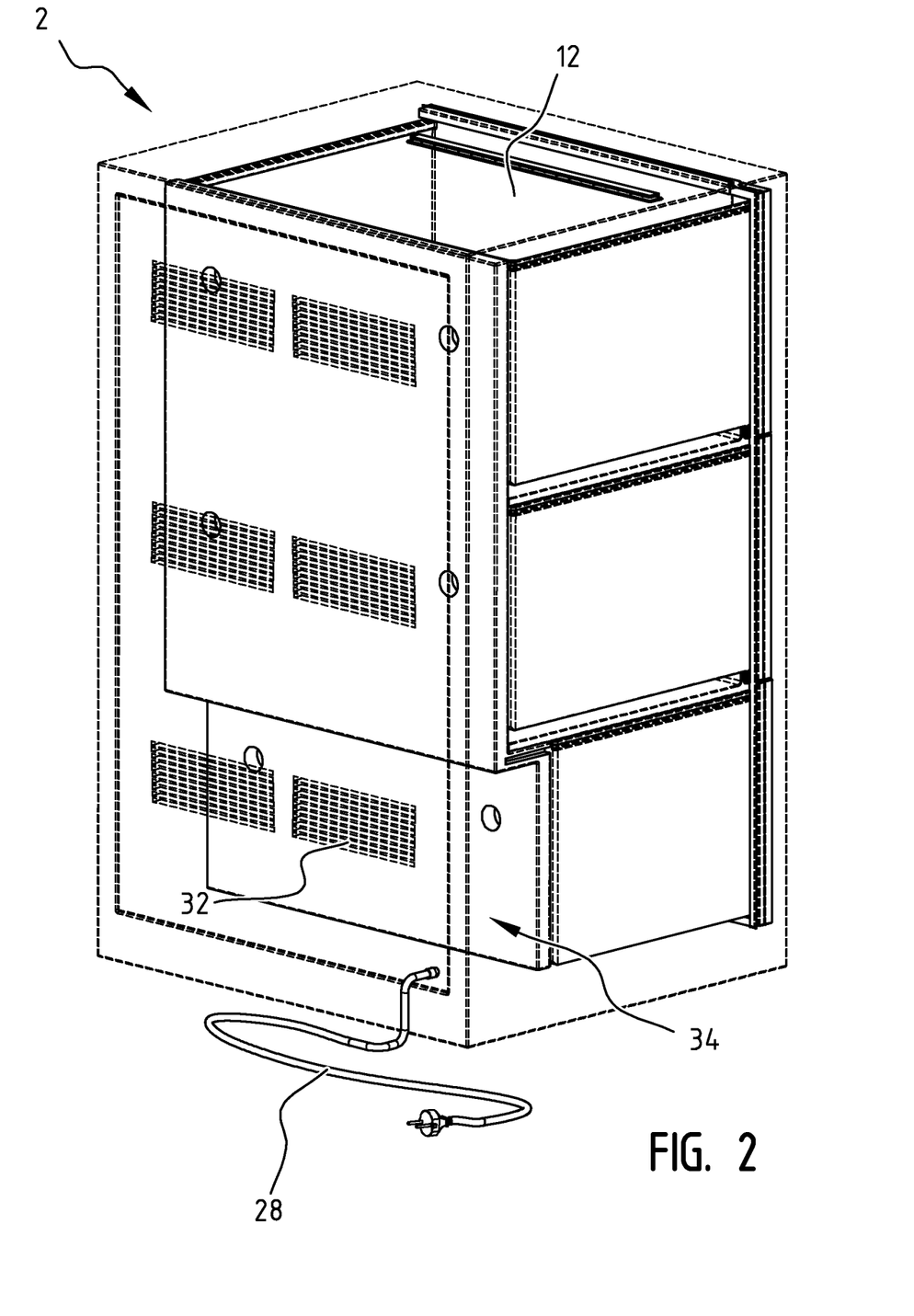
FIG. 2 is a rear view of the storage device of FIG. 1.

A filling flap 36 is further provided. In the shown embodiment filling flap 36, into which a tablet 60 can be placed, is provided on the front side of compartment 12. Other embodiments are of course also possible. Also provided is a draw-off tap 38 which in the shown embodiment is also provided on the front side of device 2. It is here also the case that other embodiments are of course possible.

A system 40 (FIG. 3) is provided with a supply 42 which in the shown embodiment moves to nitrogen membrane 44. Flowing herefrom are a gas flow 46 with a relatively high oxygen content and a gas flow 48 with a low oxygen content and a relatively high nitrogen content. Gas flow 48 is carried to a switch block 50. Diverse positions and routes for gas flow 48 through device 2 are hereby possible.

Figure 3:
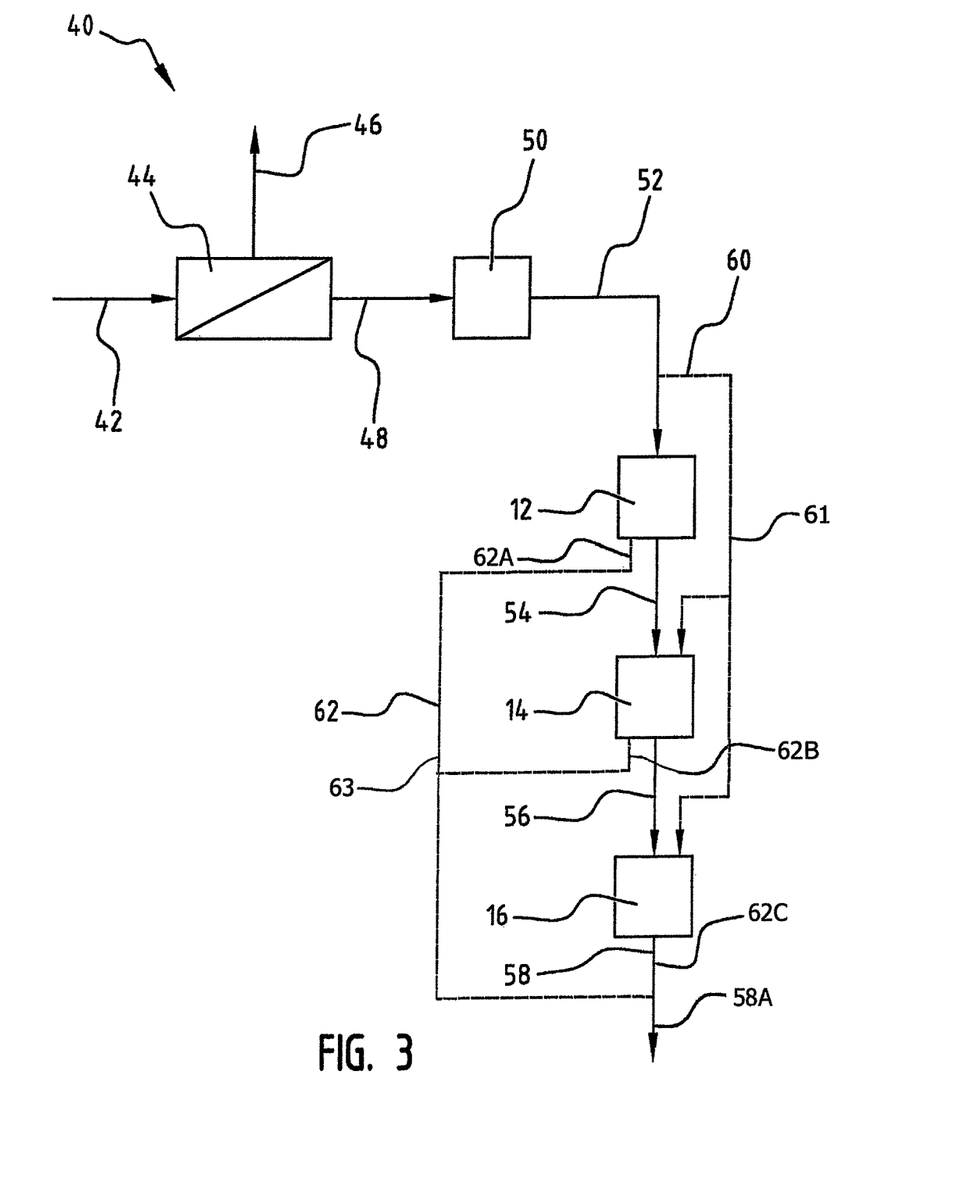
FIG. 3 is a schematic overview of the storage device of FIG. 1.

In the shown embodiment controller or switch block 50 is set such that gas flow 48 is carried via gas supply conduit 52 to compartment 12. In the shown embodiment the conditions in compartments 12, 14, 16 are chosen such that the outflow from compartment 12 can be used as inflow to compartment 14 via conduit 54. The outflow from compartment 14 can then be utilized as inflow to compartment 16 via connecting conduit 56. As a result, the compartments are connected in series, wherein the inlet of a first compartment 12 is connected to the gas supply conduit 52 such that a switch block 50 is able to configure the flow from the outlet of one of the compartments 12,14 to the inlet of the other compartments 14,16. The exit gas flow from compartment 16 is gas flow 58 which is discharged to the environment. An effective storage becomes possible in this manner.

In the shown embodiment switch block 50 realizes the desired connections. In the shown embodiment the conditions of the individual compartments are adapted to each other such that inflow and outflow can be directly connected. In other situations outside air can optionally be admixed and air from the gas membrane can be supplied directly via conduit 48 to compartments 14,16. It is also possible to provide a sort of leakage via switch block 50 whereby a part of the ambient air mixes with the produced gas in flow 48. All desired conditions can in this way be realized via switch block 50. It is thus possible for instance to guide the conditioned flow 52 parallel to compartment 12, or directly, to compartments 14,16 via a flow 60 through a bypass flow conduit 61. The bypass flow conduit 61 extends from the gas supply conduit 52 and together with the gas supply conduit 52 is connected to the compartment 12,14,16 in parallel such that the switch block 50 is able to configure the flow to travel directly to an inlet of any one or more compartments 12,14,16. It is also possible to directly discharge the exit flows from individual compartments 12,14,16 via flow 62 through a drain conduit 63 extending from the drains 62A, 62B,62C of each compartment and connected in parallel to the exit flow conduit 58A. In this manner, the switch block is able to configure the flow from any one or more compartments 12,14,16 directly to the exit flow conduit 58A. If desired, a sensor (not shown) can be placed in such a central outflow 58 in order to measure exit conditions of the individual compartments 12,14,16.

In addition to a serial connection of the compartments, the compartments can also be provided in parallel, wherein gas flow 48 is carried periodically to the individual compartments.

Sensors are optionally provided in the compartments and/or conduits. In an embodiment a sensor which can be connected periodically to the exit gas flow from the components is provided in the exit conduit in order to limit the number of sensors required. A cost-effective embodiment can hereby be obtained, wherein active regulation of the climate in an individual compartment is possible.

Figure 4:
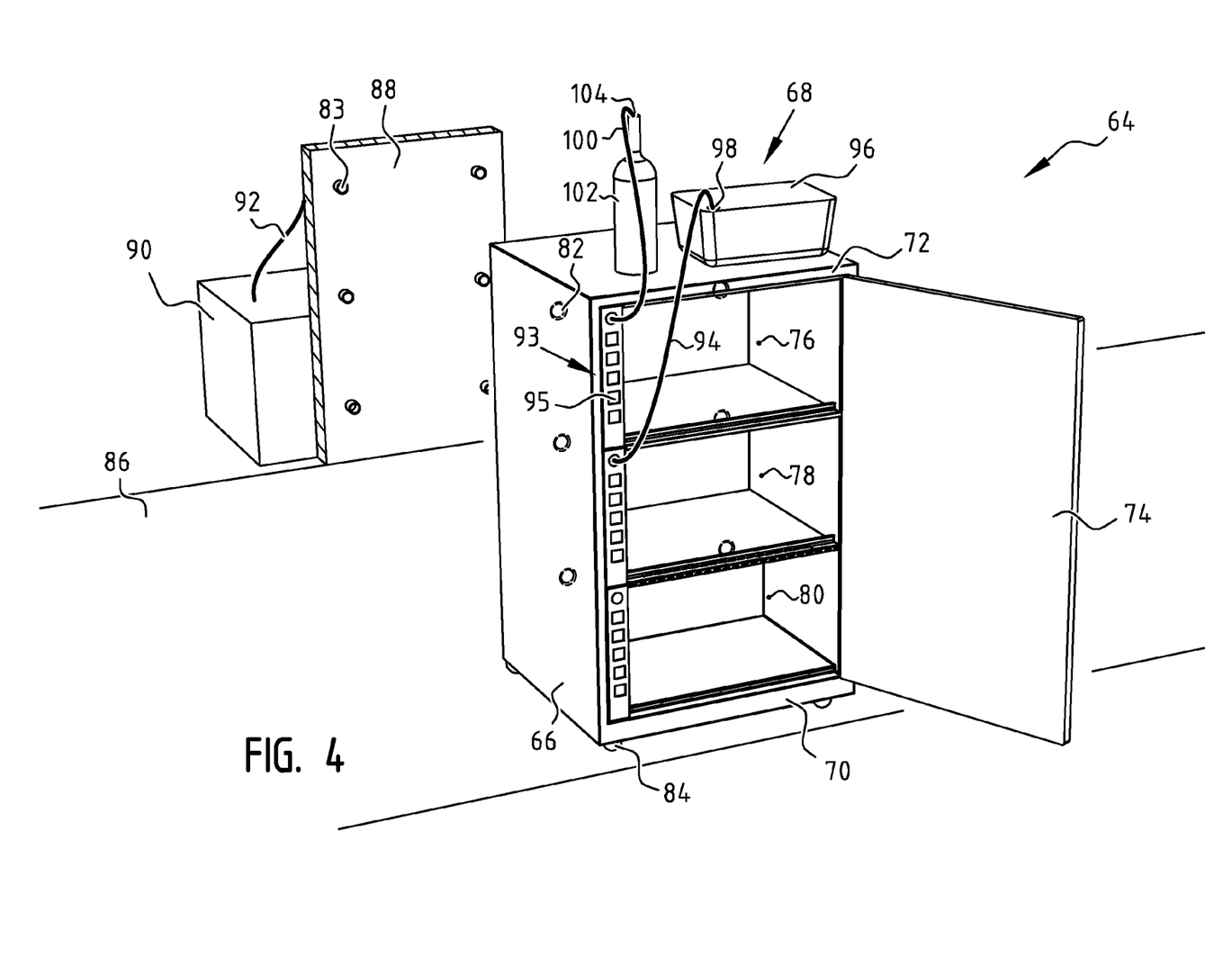
FIG. 4 is a view of an alternative storage device according to the invention.

In an alternative embodiment, storage cabinet 64 (FIG. 4) comprises two side panels 66, rear wall 68, bottom 70 and top side 72. A door 74 is arranged on the front side. In the shown embodiment storage cabinet 64 has three compartments 76, 78, 80 which can be used as shelf space and/or as chest of drawers. Rear wall 68 is provided with a number of connections 82 for realizing the desired storage conditions. Storage cabinet 64 is provided with wheels 84 to enable easy displacement of cabinet 64, for instance from a storage area to the shop part of a supermarket. Placed behind wall part 88 is conditioning equipment 90 which is connected via conduits 92 to connections 82 in cabinet 64 and 83 in the wall. Wall 88 is for instance a wall of a supermarket or storage space. Storage cabinet 64 can then be moved from the storage into the shop part and be connected to equipment 90 on the other side of wall 88. A control panel 93 with a number of keys 95 is further provided. In the shown embodiment a key 95 represents a product category and thereby enables simple adjustment of settings of equipment 90 to the products. Also provided is a drain 94 with which for instance storage containers 96 with a connection 98 can be brought to storage conditions. Containers 96 can for instance be used by consumers to store leftover food and other products for a longer storage life by making use of suitable storage conditions. An opened but not empty bottle 102 provided with a connection 104 can for instance also be stored in similar manner, for instance via a hose 100. This lengthens storage life and/or better maintains quality.

It is expressly noted that combinations of measures from the different embodiments can be mutually interchanged and/or replaced. It is thus possible for instance to also apply containers 96 for storage device 2 and/or provide filling flap 36 for storage cabinet 64. Other combinations are also possible.

The invention is by no means limited to the above described preferred embodiments thereof. The rights sought are defined by the following claims, within the scope of which many modifications can be envisaged. It is thus possible for instance to provide an ethylene concentrate to generate ethylene gas for the purpose of ripening the products.

The invention claimed is:

1. A storage device for fresh products and/or perishable produce, comprising:
   a cabinet provided with an access door and/or flap;
   at least two substantially gastight compartments arranged in the cabinet and wherein each is provided with at least one gas inlet and one gas outlet;
   a gas supply conduit for supplying gas to the compartments, and
   conditioning means suitable for conditioning the climate in the compartment, wherein the conditioning comprises of providing desired gas conditions, including oxygen content, wherein the conditioning means comprises:
   a) an outlet of a compartment operatively connected to an inlet of another compartment such that the compartments are connected in series, wherein the inlet of a first compartment is connected to the gas supply conduit such that a switch block is able to configure the flow from the outlet of one compartment to the inlet of another compartment;

b) a bypass flow conduit extending from the gas supply conduit and, together with the gas conduit, is connected to the compartments in parallel such that the switch block is able to configure the flow to travel directly to an inlet of any one or more compartments; and c) a drain conduit extending from drains of each compartment and connected in parallel to an exit flow conduit such that the switch block is able to configure the flow from any one or more compartments directly to the exit flow conduit; and wherein each compartment can be individually conditioned through the switch block.

2. The storage device as claimed in claim 1, wherein compartments are provided with individual adjusting means.

3. The storage device as claimed in claim 2, comprising a conditioning controller for adapting the conditions in compartments to each other.

4. The storage device as claimed in claim 1, further comprising a gas generator.

5. The storage device as claimed in claim 4, wherein the gas generator comprises a nitrogen membrane.

6. The storage device as claimed in claim 1, wherein the cabinet is adapted so that it can be placed as build-in appliance in a kitchen.

7. The storage device as claimed in claim 1, comprising an external draining connection for drawing off conditioned gas.

8. The storage device as claimed in claim 1, comprising a filling opening for the supply of gas conditioning products or compositions.

9. The storage device as claimed in claim 8, wherein the filling opening comprises a tablet storage space.

10. The storage device as claimed in claim 1, further comprising at least two connectors for operatively connecting the at least two compartments to conditioning equipment placed outside the storage device.

11. The storage device as claimed in claim 10, further comprising displacing means for displacing the storage device such that an operative connection can be realized via connectors.

12. The storage device as claimed in claim 1, wherein the at least two compartments are displaceable independently of the cabinet and embodied such that a compartment can be placed in and removed from the cabinet.

13. A storage container suitable for application in combination with a storage device as claimed in claim 1.

14. A tablet suitable for application in a storage device as claimed in claim 1.

15. The tablet as claimed in claim 14, suitable for producing carbon dioxide.

16. The tablet as claimed in claim 14, suitable for producing ethylene.

17. A method for storing fresh products using the storage device as claimed in claim 1, comprising the steps of:
   placing the products in a storage device as claimed in claim 1;
   selecting the desired conditions for the products;
   storing the products in the storage device; and
   connecting an outlet of a first compartment to the inlet of a second compartment.

18. The method as claimed in claim 17, wherein the storage of the products comprises ripening the products.

19. The method as claimed in claim 18, wherein the step of connecting an outlet of a first compartment to the inlet of a second compartment is for the purpose of using gases produced by products in the first compartment for ripening products in the second compartment.

20. The method as claimed in claim 17, wherein the storage of the products comprises displacing and subsequently connecting the storage device to a centrally positioned conditioning system.

21. The storage device as claimed in claim 1, wherein groups of fresh products can be stored at the desired conditions associated with these products and further including a conditioning controller to adapt these conditions to each other in order to realize an effective and efficient storage.

* * * * *